(12) United States Patent
Hudson (10) Patent No.: US 7,806,180 B2
(45) Date of Patent: Oct. 5, 2010

(54) SIGNALLING SYSTEMS AND METHODS FOR COMMUNICATING WITH A DOWNHOLE LOCATION IN A WELL INSTALLATION

(75) Inventor: Steven Martin Hudson, Sturminster Newton (GB)

(73) Assignee: Expro North Sea Limited, Berkshire (GB)

( * ) Notice: Subject to any disclaimer, the term of this patent is extended or adjusted under 35 U.S.C. 154(b) by 493 days.

(21) Appl. No.: 11/908,627

(22) PCT Filed: Mar. 20, 2006

(86) PCT No.: PCT/GB2006/000988

§ 371 (c)(1),
(2), (4) Date: Sep. 14, 2007

(87) PCT Pub. No.: WO2006/100450

PCT Pub. Date: Sep. 28, 2006

(65) Prior Publication Data

US 2008/0264633 A1    Oct. 30, 2008

(51) Int. Cl.
*E21B 47/16* (2006.01)
(52) U.S. Cl. .............. 166/250.01; 166/66; 367/82; 340/854.4; 340/854.5; 340/855.1
(58) Field of Classification Search ............ 166/250.01, 166/376, 66, 65.1, 244.1; 367/82; 340/853.7, 340/854.4, 854.5, 854.9, 855.1
See application file for complete search history.

(56) References Cited

U.S. PATENT DOCUMENTS

| | | | | |
|---|---|---|---|---|
| 4,523,194 A | * | 6/1985 | Hyde | 340/853.3 |
| 5,576,703 A | | 11/1996 | MacLeod et al. | |
| 5,730,219 A | * | 3/1998 | Tubel et al. | 166/250.1 |
| 5,941,307 A | * | 8/1999 | Tubel | 166/313 |
| 6,515,592 B1 | * | 2/2003 | Babour et al. | 340/854.4 |
| 7,324,011 B2 | * | 1/2008 | Richardson | 340/854.5 |
| 7,554,458 B2 | * | 6/2009 | Hudson et al. | 340/854.9 |
| 2002/0084913 A1 | * | 7/2002 | Hudson et al. | 340/853.1 |
| 2004/0129424 A1 | | 7/2004 | Hosie et al. | |

(Continued)

FOREIGN PATENT DOCUMENTS

FR    2 848 363    6/2004

(Continued)

OTHER PUBLICATIONS

The Standard Search Report for GB 0505855.7; Filed Mar. 22, 2005; Date of Completion Nov. 15, 2005.

(Continued)

*Primary Examiner*—David J Bagnell
*Assistant Examiner*—David Andrews
(74) *Attorney, Agent, or Firm*—Alston & Bird LLP (57) ABSTRACT

Methods and systems are described for communicating with downhole locations and transmitting power to downhole locations. Use is made of a cable passing someway down into the well. This cable may be connected to a downhole sensor and may be used primarily for communicating with that sensor, but also used in the current techniques described herein. Electrical connection is achieved between the cable and the metallic structure of the well to allow signals to be transferred between the communications tool and the surface via the cable.

32 Claims, 6 Drawing Sheets

U.S. PATENT DOCUMENTS

| | | |
|---|---|---|
| 2005/0024231 A1 | 2/2005 | Fincher et al. |
| 2005/0046589 A1 | 3/2005 | Wisler et al. |
| 2006/0044155 A1 | 3/2006 | Le Briere et al. |

FOREIGN PATENT DOCUMENTS

| | | |
|---|---|---|
| WO | WO 01/44461 | 1/2001 |
| WO | WO 01/55555 | 8/2001 |
| WO | WO 01/65067 | 9/2001 |
| WO | WO 02/054636 | 7/2002 |

OTHER PUBLICATIONS

The PCT International Search Report for PCT Application No. PCT/GB2006/000988; Filed Mar. 20, 2006; Date of Completion May 15, 2006; Date of Mailing May 29, 2006.

The Written Opinion for PCT Application No. PCT/GB2006/000988; Filed Mar. 20, 2006.

The Response to Written Opinion Dated Oct. 6, 2006.

The International Preliminary Report on Patentability for PCT Application No. PCT/GB2006/000988; Filed Mar. 20, 2006.

* cited by examiner

PRIOR ART

SIGNALLING SYSTEMS AND METHODS FOR COMMUNICATING WITH A DOWNHOLE LOCATION IN A WELL INSTALLATION

This invention relates to signalling downhole. It is particularly relevant to situations where it is desired to communicate with a tool which is deployed within the tubing of a well and which is arranged to put signals onto the metallic structure of the well and/or extract signals from the metallic structure of the well and this provides a wireless communication link. With such signalling techniques there is a need to pick up signals from the metallic structure of the well at the surface end of the link when the tool is arranged to transmit and/or a requirement to put signals onto the metallic structure of the well at the surface end of the link when the tool is arranged to receive. It is preferable if this link is downhole from the well head itself to reduce interference from (electrical) noise at the surface and improve range. The present invention is concerned with facilitating this pickup of signals from the metallic structure and/or the application of signals to the metallic structure.

The applicants and others have successfully implemented downhole signalling techniques where the metallic structure of the well is used as a signal channel and earth is used as return. At the surface end of the link some means has to be provided for extracting the signals applied to the downhole structure and/or to apply signals to the downhole structure. There are various ways in which this can be achieved, for example by installing a dedicated cable which makes contact with the downhole structure of the well and passes through the well head. However, the introduction of such additional cables is undesirable and in an existing well installation (completed well) it is not possible to introduce any such dedicated cable without disrupting the current installation, for example by pulling all of the production tubing and remaking the well.

On the other hand, existing transmission systems which make use of a tool which can be deployed within the production tubing may be retrofitted to existing wells and used to signal within existing wells provided that some means for contacting with the downhole structure at the surface end of the link can be found. Thus, it is desirable to provide apparatus and methods for picking up signals from the downhole structure and/or applying signals to the downhole structure at the surface end of the link which do not require the installation of a dedicated cable for this purpose.

It will be noted that the avoidance of the need for a dedicated cable is advantageous not only when retrofitting a communication system to a well but also if a new installation is set up as it removes the need for an additional dedicated cable to be installed.

In many existing oil fields, at least some of the wells will be provided with a permanent downhole gauge (PDG) which is provided for measuring the product pressure in the production tubing at a downhole location. These permanent downhole gauges are typically provided at a relatively shallow depth in the well, on the wellhead side of the pressure resistant packer which is provided in the annulus between the casing and the production tubing. Such permanent downhole gauges are normally connected to the surface by a dedicated cable in the form of a coaxial cable which has a core electrically connected to the equipment of the permanent downhole gauge and which is connected to topside equipment at the surface/wellhead.

Such permanent downhole gauges can provide useful information about the well but generally, because the pressure is being measured at a relatively shallow depth within the well, the information is not as accurate as it might be if pressure measurements were taken further down in the well closer to the producing portion of the formation. Further, in any given oil field a significant number of the wells provided with a permanent downhole gauge will not actually be producing data due to a failure in the permanent downhole gauge system. Such failures can occur through a number of routes. Sometimes during installation the cable which was connected to the permanent downhole gauge is crushed, severed or otherwise damaged. Sometimes the permanent downhole gauge itself is either damaged during installation or fails under the relatively harsh conditions downhole either immediately upon activation or after some period of useful operation.

Therefore, it is desirable to provide systems and methods for extracting measurements, for example, pressure measurements from a well in which the original permanent downhole gauge has failed.

The applicants have realised that in at least some circumstances, the presence of a functioning or non-functioning permanent downhole gauge may be useful in applying data to and/or extracting data from the downhole structure at the surface end of a wireless link to a downhole tool. At least some embodiments of the present invention are directed at making use of this realisation.

According to one aspect of the present invention there is provided a method of extracting data from a well installation which installation comprises a cable running from the surface to a downhole location, the method comprising the steps of:

ensuring that there is electrical connection between the cable and downhole metallic structure of the well;

introducing a tool into the well for applying signals to the downhole metallic structure of the well; and applying signals, which encode data, to the metallic structure using the tool and extracting the encoded data at the surface by sensing signals in the cable.

According to another aspect of the present invention there is provided a method of transmitting data to a downhole location in a well installation which installation comprises a cable running from the surface to a downhole location, the method comprising the steps of:

ensuring that there is electrical connection between the cable and downhole metallic structure of the well;

introducing a tool into the well for sensing signals on the downhole metallic structure of the well; and applying signals, which encode data, to the metallic structure using the cable and extracting the encoded data at the tool by sensing signals in the metallic structure.

The tool may be arranged for both sending and receiving signals and the method may comprise the step of signalling in two directions along the cable and metallic structure.

According to another aspect of the present invention there is provided a downhole signalling system for extracting data from a well installation which installation comprises a cable running from the surface to a downhole location, wherein the cable and downhole metallic structure of the well are electrically connected or electrically connectable, and the signalling system comprises:

a tool disposed within the well and arranged for applying signals, which encode data, to the downhole metallic structure of the well; and topside apparatus arranged for extracting the encoded data at the surface by sensing signals in the cable.

According to another aspect of the present invention there is provided a downhole signalling system for transmitting data to a downhole location in a well installation which installation comprises a cable running from the surface to a downhole location, wherein the cable and downhole metallic structure of the well are electrically connected or electrically connectable, and the signalling system comprises:

topside apparatus arranged for applying signals, encoding data, to the cable; and a tool disposed within the well and arranged for extracting the encoded data by sensing signals in the downhole metallic structure of the well.

The signalling system may be arranged for transmitting signals in two directions with the tool and top side apparatus being arranged both for transmitting and receiving signals.

The well installation may be an existing well installation which comprises an existing cable. The method can include the step of introducing the tool into the existing well installation and making a connection to the existing cable to allow sensing of signals applied to the metallic structure of the installation by the tool.

The step of ensuring that there is electrical connection between the cable and the downhole structure of the well may comprise the step of checking whether there is such a connection. This is particularly relevant where the method is used with existing well installations.

The step of checking whether there is electrical connection between the cable and the downhole structure of the well may comprise assessing the effective length of the cable. A TDR (time domain reflection) technique may be used in assessing the effective length of the cable. The effective length of the cable may be its actual length but may be some other length, for example the length of the cable from the surface to a point where the cable has been severed or brought into shorting contact with metallic structure of the well.

During the setting up of a well installation, cables which are designed to run from the surface to a predetermined location on the structure, perhaps to a sensor, are sometimes crushed, damaged or severed. In at least some existing installations the intended or desired length of a cable connecting the surface to a predetermined location on the structure will be known. Because of this, in at least some cases it is possible to determine if a cable is intact by measuring its effective length.

Topside apparatus may be provided for sensing signals in the cable. The topside apparatus may be arranged for extracting data from the sensed signals. In use the topside apparatus may be connected to the cable and to earth as a reference.

The well installation may comprise a downhole sensor unit. The downhole sensor unit may comprise a downhole gauge. The sensor unit may be a permanent downhole gauge (PDG). The sensor unit may be arranged for measuring pressure in product flowing with production tubing of the installation.

The cable may be provided in the well installation for providing a communication path to the surface for readings taken by the downhole sensor. The cable may be electrically connected to the downhole sensor unit. The downhole sensor unit may be electrically connected to the metallic structure of the well installation. The downhole sensor may be arranged so that the cable is electrically connectable to the metallic structure of the well installation through the sensor unit. The downhole sensor unit may be arranged so that the cable is electrically connected to the metallic structure of the well installation through the sensor unit.

Typically the downhole sensor will be an existing component in an existing well installation. Thus often there will be no opportunity to choose characteristics of the sensor unit. Some of the present methods are directed more at taking advantage of the characteristics of already installed, working or failed sensor units to provide connection between the cable and the metallic structure of the well installation.

The method may comprise the step of operating on the downhole sensor unit so as to connect the cable to the downhole structure.

The step of operating on the downhole sensor unit may comprise the step of applying a biasing signal to the cable which causes the downhole sensor unit to connect the cable to the downhole structure at least as far as small signals are concerned. Here the term "small signals" is used in the sense of differentiating from the "large" biasing signal in accordance with standard terminology in electronics. Preferably the biasing signal is chosen so that after application of the biasing signal is ceased the downhole sensor unit returns to its original state. Thus if the sensor unit was a functioning sensor unit prior to application of the biasing signal, the sensor is preferably still a functioning sensor unit after the application of the biasing signal.

The topside apparatus may be arranged to apply the biasing signal to the cable.

The step of operating on the downhole sensor unit may comprise the step of applying a destructive signal to the cable which causes the downhole sensor unit to irreversibly connect the cable to the downhole structure. In practice such a destructive signal can be chosen so as to fuse or destroy a component within the sensor unit providing a short circuit between the cable and metallic structure of the well installation.

The topside apparatus may be arranged to apply the destructive signal to the cable.

The topside apparatus may comprise means for operating on the downhole sensor.

The topside apparatus may comprise a voltage source. The voltage source may be arranged for biasing the downhole sensor unit. The voltage source may be connected or connectable in series between the cable and earth. Impedance means may be connected in series between the voltage source and the cable. The topside apparatus may comprise a transmitter and/or receiver, a terminal of which may be connected to a contact point electrically between the cable and the impedance means. Another terminal of the transmitter and/or receiver may be connected to ground. The impedance means may have a value chosen to substantially equalize the impedance seen between the voltage source and the contact point and the impedance seen between the contact point and ground via the cable. The impedance means may have a value chosen in an effort to equalize the impedance seen between the voltage source and the contact point and the impedance seen between the contact point and ground via the cable.

The impedance means may comprise any one of or any combination of: a resistor, a capacitor and an inductor. Preferable the impedance means comprises a resistor.

The topside apparatus may comprise a current source. The current source may be for biasing the downhole sensor unit. The current source may be connected in series between the cable and earth. A terminal of the transmitter and/or receiver may be connected to a point between the current source and the cable.

The component to be fused or destroyed may be a surge protection device such as an avalanche (eg Zener) diode connected across the terminals of the sensor unit. A pulse of current of a suitable sense, magnitude and duration can be successfully used to destroy a zener diode in such a way as to provide a short circuit in a repeatable fashion. Suitable magnitudes and durations for such pulses may be determined by modelling and/or empirically.

In other circumstances there may be a short circuit between the cable and the metallic structure due to damage which has occurred during installation or operation.

Where there is a short circuit between the cable and the downhole structure, the signal applied to the downhole structure may be sensed directly by measuring the signal seen on the cable at the surface relative to earth.

According to another aspect of the present invention there is provided a method of transmitting power to a downhole location in a well installation which installation comprises a cable running from the surface to a downhole location, the method comprising the steps of:

ensuring that there is electrical connection between the cable and downhole metallic structure of the well;

introducing a tool into the well for extracting power from signals on the downhole metallic structure of the well; and applying power signals to the metallic structure using the cable and extracting power at the tool by sensing resulting signals in the metallic structure.

The method of transmitting power to a downhole location may be used in conjunction with the method extracting data from and/or transmitting data into the well. The power delivered to the tool by may be used to transmit data from the tool to the surface.

According to another aspect of the present invention there is provided a downhole power delivery system for transmitting power to a downhole location in a well installation which installation comprises a cable running from the surface to a downhole location, wherein the cable and downhole metallic structure of the well are electrically connected or electrically connectable, and the power delivery system comprises:

topside apparatus arranged for applying power signals to the cable; and a tool disposed within the well and arranged for extracting power by sensing resulting signals in the downhole metallic structure of the well.

The system for power delivery may be used in conjunction with a system for signalling in one or both directions.

For the avoidance of doubt it should be noted that each of the respective systems may be arranged to carry out each of steps of the corresponding methods defined above.

According to another aspect of the present invention there is provided a method of extracting data from an existing well installation which existing installation comprises a cable running from the surface to a downhole location, the method comprising the steps of:

ensuring that there is electrical connection between the cable and downhole metallic structure of the well;

introducing a tool into the well for applying signals to the downhole metallic structure of the well; and applying signals, which encode data, to the metallic structure using the tool and extracting the encoded data at the surface by sensing signals in the cable.

Embodiments of the present invention will now be described, by way of example only, with reference to the accompanying drawings in which.

Figure 1:
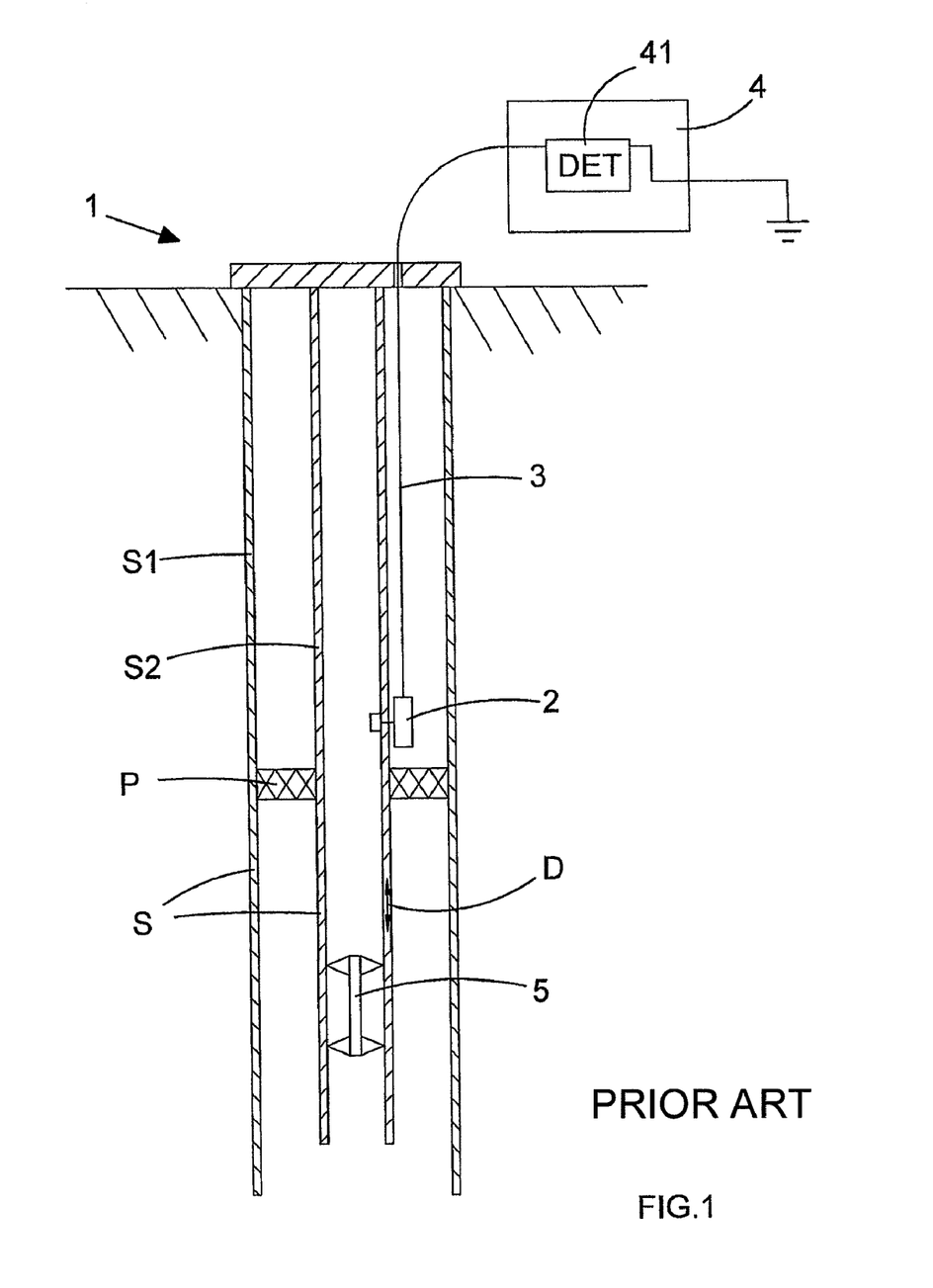
FIG. 1 schematically shows a completed well installation including a permanent downhole gauge and a downhole signalling tool.

FIG. 1 schematically shows a completed well installation 1 which comprises a downhole gauge 2. The completed well installation 1 comprises downhole metallic structure S including casing portions S1 and production tubing portions S2. As is conventional, a pressure resistant packer P is provided in the annulus between the production tubing S2 and the casing S1. The permanent downhole gauge 2 is arranged for measuring the pressure in the product inside the production tubing S2 at a point just above the packer P. The permanent downhole gauge 2 is mechanically and electrically connected to the production tubing S2. Furthermore, the permanent downhole gauge 2 is electrically connected via a cable 3 to topside apparatus 4 including a detector 41 for detecting signals output by the permanent downhole gauge 2. The cable 3 is a coaxial cable and the core of this coaxial cable acts as the conductor for carrying signals from the downhole gauge 2 to the detector 41. Another terminal of the detector 41 is connected to ground and signals may be transmitted by the permanent downhole gauge 2 since it is effectively connected to ground via the production tubing S2 and hence the remainder of the metallic structure S of the well.

Also shown disposed within the well installation is a downhole communication tool 5 which is arranged for wireless communications within the production tubing. In particular, the downhole communication tool 5 is arranged for applying signals to the production tubing S2 and for extracting signals from the production tubing S2. The structure and functioning of a suitable downhole communication tool 5 has been the subject matter of previous patent applications filed by and published in the names of Flight Refuelling Limited and Expro North Sea Limited, for example WO0104461 and WO02054636. The structure and functioning of the downhole communication tool 5 is not pertinent to the present invention besides the fact that it functions by applying signals onto the metallic structure and extracting signals from the metallic structures. Therefore, no more detailed description of its structure or functioning will be given in the present specification.

The present specification is concerned with making use of the presence of the permanent downhole gauge 2 and/or its cabling 3 to allow the pickup of signals put onto the downhole structure S by such a downhole communication tool 5 or the putting of signals onto the downhole structure S from the surface in order that these signals may be communicated to such a downhole communication tool 5.

Figure 2:
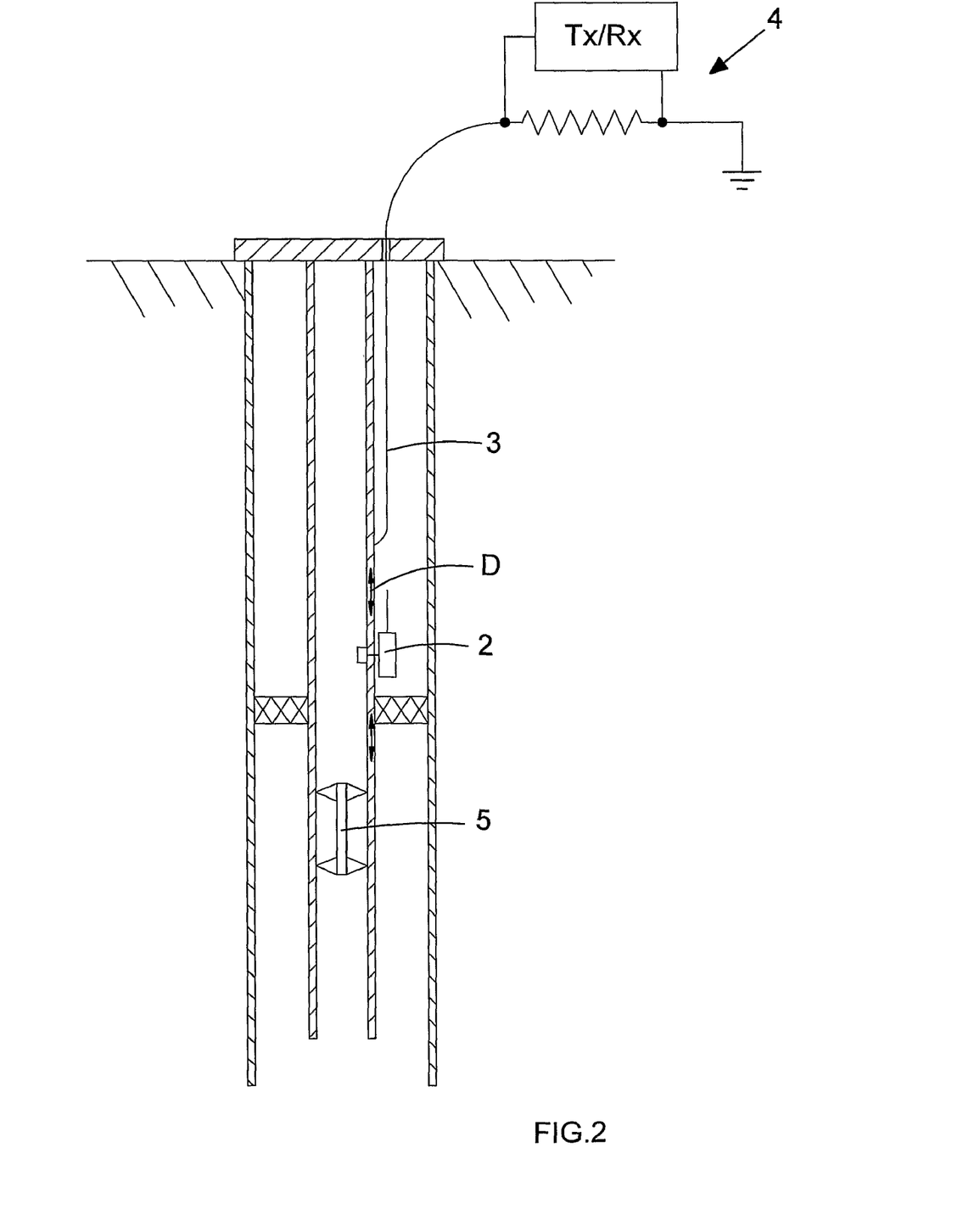
FIG. 2 shows a completed well installation similar to that shown in FIG. 1 but in which a cable that should be connected to the permanent downhole gauge has been severed and brought into shorting contact with the metallic structure of the well.

Double headed arrows D, in FIGS. 1 and 2, schematically illustrate the path of data signals or indeed power signals travelling along the metallic structure, in this case the production tubing S2, between the downhole communication tool 5 and the surface.

FIG. 2 shows perhaps the simplest way in which use may be made of at least part of the equipment originally provided with the intention of providing a functioning downhole gauge 2. Here the cable 3 is shown contacting with the production tubing S2. This illustrates the situation where during installation of the tubing into the well, the cable 3, intended to provide a connection to the downhole gauge 2, was severed, crushed or otherwise damaged such as to bring the core of the cable 3 into shorting contact with the downhole structure S. In such a circumstance, there can be good electrical contact between the cable 3 and the downhole structure S, and as such, this cable 3 can be used as a pickup/injection cable for picking up signals off of the metallic structure/applying signals to the metallic structure S. Of course, as the cable 3 has been severed it does not make a proper connection with the permanent downhole gauge 2 and this permanent downhole gauge 2 in effect is redundant. This means that in this scenario, use may simply be made of the cable 3 for transmitting signals to the downhole communication tool 5 via the cable 3 and metallic structure S and receiving signals from the downhole communication tool 5 via the metallic structure S and cable 3. Thus, in this situation the topside apparatus 4 may comprise a transmitter and receiver for transmitting and receiving such signals which may, for example, be connected across a resistor connected in series with the cable 3 and ground.

Figure 3:
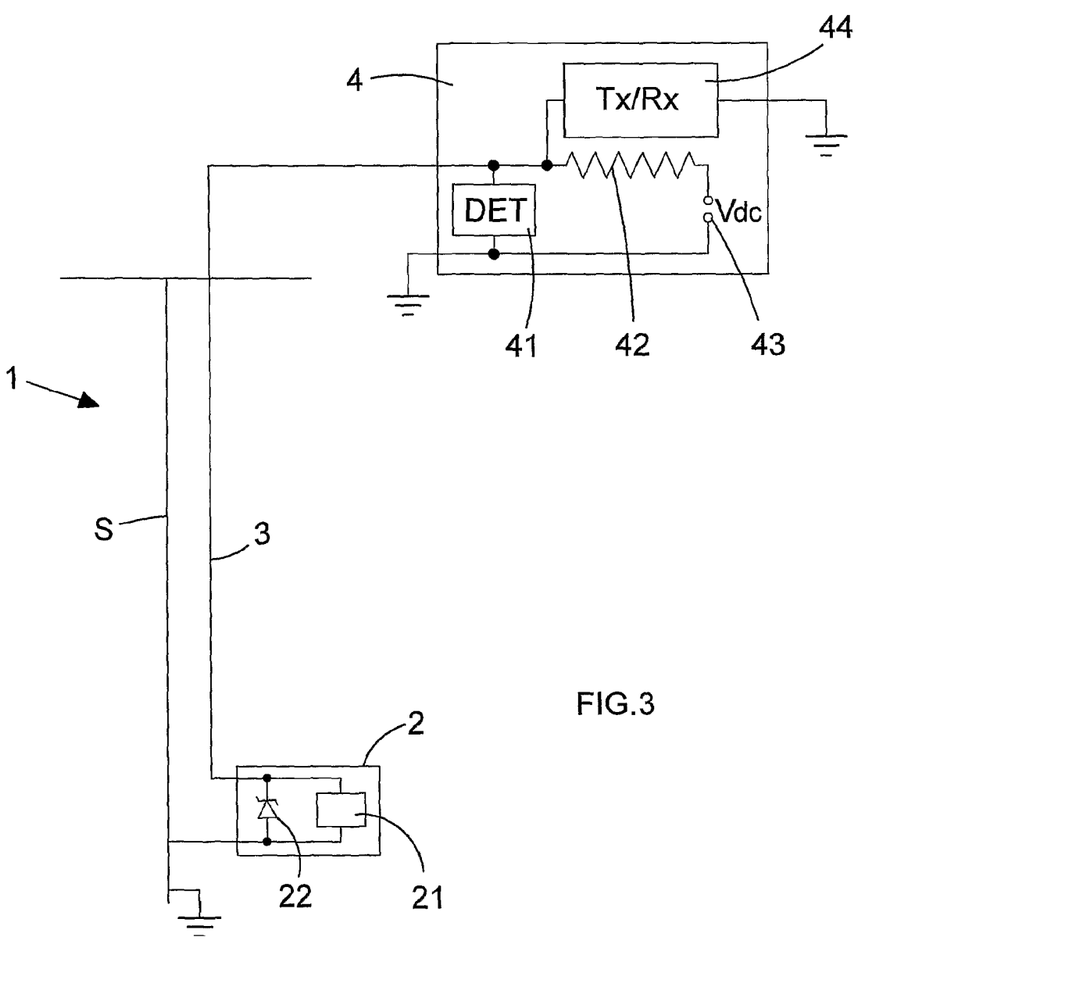
FIG. 3 shows, in highly schematic form, a well installation of the type shown in FIG. 1 and including topside apparatus arranged for applying signals to the downhole structure/extracting signals from the downhole structure.

FIG. 3 shows a well installation 1 including a permanent downhole gauge 2 of the same general type as is shown in FIG. 1 but here the well 1 and permanent downhole gauge 2 are shown in more schematic form. Here the downhole metallic structure S of the well is shown as a single line. As mentioned above, and as shown in FIG. 3, the permanent downhole gauge unit 2 is electrically connected to the metallic structure S. Within the downhole gauge unit 2 there is provided control, sensing, and communication circuitry 21 which is connected between the cable 3 and ground via the connection to the metallic structure S. Connected across the two terminals of the downhole gauge unit 2, and hence also across this circuitry 21, is a protective Zener diode 22. The Zener diode 22 is provided in a conventional way such that under normal operation it is reversed biassed and therefore does not conduct but will conduct in a breakdown or avalanche mode if the input terminal of the downhole gauge unit 2 is subjected to a surge or spike that might damage the circuitry 21.

If the downhole gauge circuitry 21 is functioning correctly there will be an electrical connection between the cable 3 and the metallic structure S whilst the device is functioning. The existence of this electrical connection between the cable 3 and the metallic structure S provides a path through which signals may be injected onto the metallic structure S for detection by the downhole communication tool 5 and similarly a path through which signals from the downhole tool 5 may pass from the metallic structure S and into the cable 3.

The topside apparatus 4 in the well installation shown in FIG. 3 is modified from the topside apparatus 4 shown in FIG. 1. In particular, a resistor 42 and controllable DC voltage source 43 are connected in series across the detector 41. Furthermore, a transmitter and receiver unit 44 for transmitting signals to the downhole communication tool 5 and receiving signals from the downhole communication tool 5 is provided with one terminal connected to a side of the resistor 42 opposite that side which is connected to the voltage source 43 and another terminal connected to ground.

If attempts are made to signal between the downhole communication tool 5 and the topside apparatus 4 whilst the downhole gauge unit 2 itself is communicating with the topside apparatus 4 difficulties can occur unless the modulation schemes used for both types of transmission do not interfere with one another. Simultaneous operation of both signalling systems is a possibility but whether it will work in practice will just depend on the modulation schemes and the communication techniques used by the downhole gauge 2 and its associated detector 41.

If the communication techniques and modulation schemes used are compatible then the transmission/receiving unit 44 may communicate with the downhole tool 5 whilst the downhole gauge 22 and its detector 41 are communicating. However, even if signalling between the transmission/receiving unit 44 and the downhole communication tool 5 in such circumstances is not possible, then communication is still possible at times when the downhole gauge unit 2 and its detector 41 are not communicating with one another. This is achieved by using the controllable DC voltage source 43 to apply a biassing voltage to the circuitry 21 provided in the downhole gauge unit 2. This biassing voltage will again create the electrical connection path between the cable 3 and the downhole structure S via the circuitry 21. Once this connection path exists, it is again possible to communicate in both ways between the transmitter and receiver unit 44 and the downhole communication tool 5.

Here, where reference is made to the making of an electrical connection between the cable 3 and the downhole structure S due to the application of a biassing signal, what happens is that "small signals" (in the electronics sense and as opposed to "large signals") travel across the unit 2 by virtue of the voltage of one of the terminals following the voltage of the other of the terminals whilst the unit 2 is functioning or biased. In these techniques it is "small signals" which are of interest—these are of in the order mV say 40 mV. Where there is direct connection between the cable 3 and structure S (for example as in FIG. 2), these "small signal" issues do not arise.

During transmission and reception of signals at the topside apparatus 4, the resistance in the cable 3 and in the resistor 42 provided in the topside apparatus 4, operate as a voltage divider such that not all of the signal transmitted by the tool 5 is seen by the receiver 44 but the apparatus can be constructed so that enough signal can be seen to allow the reception of data. In this regard the value of the resistance 42 may be chosen to match the resistive value of the length of the cable 3 between the topside apparatus 4 and the downhole gauge unit 2 to maximise the signal seen at the receiver in the transmitter/receiving unit 44.

In other circumstances, the downhole gauge unit 2 may not function correctly or indeed at all. In some such cases where that is true, it is possible still to provide an electrical connection path between the cable 3 and the downhole structure S through the downhole gauge unit 2 by applying an appropriate biassing current using the controllable DC voltage source 43. If this can be achieved then communication between the downhole tool 5 and topside apparatus 4 may be achieved in the same way as described above without any concern for the functioning of the downhole gauge unit 2 and its detector 41 because, of course, these are non-functioning in that scenario.

Figure 4:
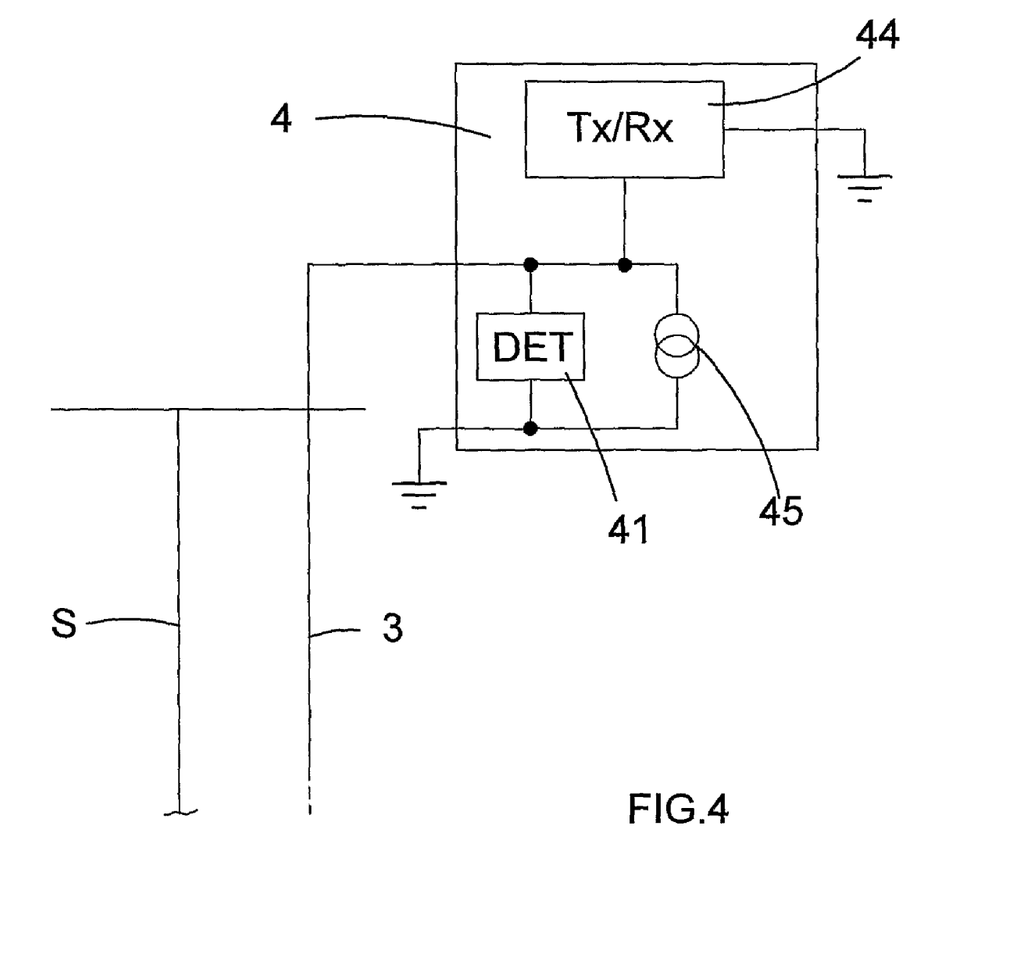
FIG. 4 shows again in highly schematic form, part of a well installation including topside apparatus which is similar to, but has an alternative form, to that shown in FIG. 3.

FIG. 4 shows an alternative set of topside apparatus 4 which may be used in communication techniques which are basically the same as those described above in relation to FIG. 3. In FIG. 4, the resistor 42 and controllable voltage source 43 are replaced with a controllable current source 45 which is again arranged to apply a suitable biassing signal to the downhole gauge unit 2 to allow signalling to and/or from the metallic structure S. The provision of a suitable current source 45 is intrinsically very difficult, but if this can be achieved, the apparatus shown in FIG. 4 is preferable to that shown in FIG. 3 as the requirement for the resistor 42 is removed and this means that a greater proportion of the signal injected onto the metallic structure S by the downhole communication tool 5 should be seen at the receiver of the transmitter receiving unit 44.

An alternative, and possibly more practical (in the case of the situations shown in FIGS. 3 and 4) way of sending data to the downhole communication tool 5 from the surface to that described above is to turn the downhole gauge unit 2 on and off from the surface (e.g. supply and interrupt a driving current to the unit 2) in a specific pattern encoding data and detect the resulting signal seen at the tool 5, decoding the signal to extract the encoded data. This technique makes use of the quiescent current in the downhole gauge unit 2 as a signalling current to be detected at the tool 5. It will be seen that the switching on and off of the unit 2 allows simple digital signals to be sent. Data rates will be low, with perhaps 1 bit being sent every 10 or 20 seconds, but this can be sufficient for infrequently needed, low data content control signals.

Figure 5:
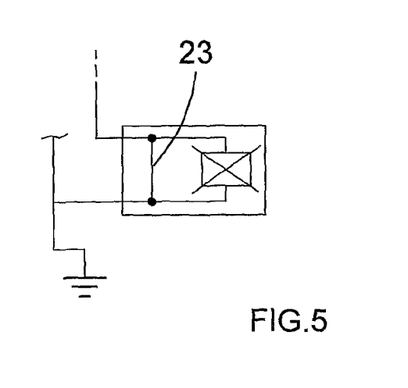
FIG. 5 shows a permanent downhole gauge unit of a similar type to that included in the well installation shown in FIGS. 1 to 4 but after modification by the application of a destructive signal.

FIG. 5 schematically shows a downhole gauge unit 2 of the same type as is shown in FIG. 3 but after having been modified by the application of a destructive signal. The idea here is to apply a destructive signal via the cable 3 which serves to destroy the Zener diode 22 by melting or fusing its component material. It is found in practice that applying such a destructive signal to a Zener diode will normally result in a short circuit being created as illustrated by the connection 23 shown in FIG. 5. In applying such a destructive current to destroy a Zener diode care must be taken not to completely vaporise the component which, of course, would leave an open circuit. However, if this potential pitfall is avoided, the provision of a short circuit between the incoming and outgoing terminals of the downhole gauge unit 2 can be fairly reliably produced. This of course means that there is a direct electrical connection between the cable 3 and the downhole structure S. In this situation, communication with the downhole tool 5 may be achieved by transmitting signals directly onto the cable 3 and receiving signals directly from the cable 3, perhaps using an arrangement similar to that of the topside apparatus shown in FIG. 2. This technique would be used with a non-functioning or redundant downhole gauge.

It will be noted therefore, that depending on the situation, the presence of a functioning or failed permanent downhole gauge may be used in a number of different ways in order to provide a path for communication with the downhole communication tool 5.

Furthermore, such a downhole communication tool 5 may be positioned deeper into the well than the downhole gauge 2. Such a tool 5 can, for example, be positioned in a portion of the production tubing which extends beyond the casing S1 or in an installation where the casing S1 extends beyond the production tubing S2, the tool 5 may be located beyond the production tubing and make suitable contact with the metallic casing S1. Thus, not only is it possible to use such a downhole communication tool 5 to extract pressure and other measurements from a well where the downhole gauge 2 has failed, it will sometimes also be possible to provide a greater degree of accuracy or more information about a well which has a functioning permanent downhole gauge 2.

Another possibility is to use the downhole communication tool 5 to take measurements during setup of the well and provide calibration measurements with which the downhole gauge 2 can be calibrated. In this way after the batteries in the downhole communication tool 5 have run out, if the permanent downhole gauge 2 continues to function, more accurate measurements may be taken by the permanent downhole gauge 2 due to the calibration data provided by the downhole communication tool 5 whilst functioning.

This calibration is useful because, in order to give information regarding the pressure in the active part of the formation using the data from a conventional downhole gauge 2, it is necessary to model and allow for the change in pressure between the location of interest and the location of the downhole gauge. Due to the nature of an actual well and the variable hydraulic losses up a particular well, it is not possible to achieve a highly accurate model. Having calibration data from the area of interest or closer to the area of interest can significantly improve the accuracy which can be obtained.

As alluded to above, whilst the primary purpose of providing a signal communication path between the topside apparatus 4 and the downhole communication tool 5 will be for the transmission of data in one or both directions (so that details of sensed parameters may be reported via the tool 5 to the surface and control signals may be sent from the surface to the tool) it is also possible to provide power to the tool 5 by applying power signals to the metallic structure S via the cable 3. Again the way in which this is feasible will depend on a given situation.

In the situation shown in FIG. 2 or shown in FIG. 5, where there is no functioning permanent downhole gauge 2 to be concerned about, the provision of high currents to feed power to the tool 5 would not be problematic. In other circumstances the provision of power may still be possible although more care will be required.

In this regard it should be noted that a downhole communication tool 5 may be required to transmit a relatively small amount of data and fairly infrequently. Therefore, even if the power it requires to transmit is quite high, there can be a long period available for charging up a suitable charge storage device/capacitor within the tool 5 between these transmissions.

In a system where the cable 3 is used to supply power to the downhole gauge unit 2 and hence on to the downhole communication tool 5, if a 2A power supply signal is applied to the surface end of the cable 3 this might result in the potential difference drop of say 20 mV over a 10 meter length of tubing S2 local to the point where the cable is connected to the tubing. If a low input voltage DC to DC converter is provided in a downhole communication tool 5 located at this region, i.e. spanning a 10 meter length of tubing, this voltage difference may be sufficient to charge a capacitor or other storage device so that periodic (say every 10 minutes or every hour) transmission of data back to the surface is possible without a battery pack in the downhole tool 5. This could lead to the provision of a downhole tool that could be used permanently rather than having a relatively limited lifetime dictated by battery life. In this respect, it should be noted that even if little signalling is carried out using a downhole tool 5 then under the conditions within the well, batteries tend to self-discharge in a relatively short period (in the order of months).

The practicality of using the present type of system for powering the downhole communication tool 5 will be higher if the downhole communication tool 5 is located close to the point at which the cable 3 makes contact with the metallic structure S, be this directly as in the situation as shown in FIG. 2, or via the structure of the downhole gauge unit 2 as shown in the other figures.

In circumstances where a dedicated cable is provided in a new completion which makes direct contact with the metallic structure S, it might be possible to deliver higher currents to the tubing S2 in the region of that connection and thus provide higher power charging currents to a downhole communication tool 5 in the vicinity of the connection. The ability to supply higher currents would allow more regular and/or faster updates and might also allow the downhole communication tool to be spaced further away from the point at which the cable 3 is connected to the downhole structure, i.e. the tool might be located deeper in the well.

Figure 6A:
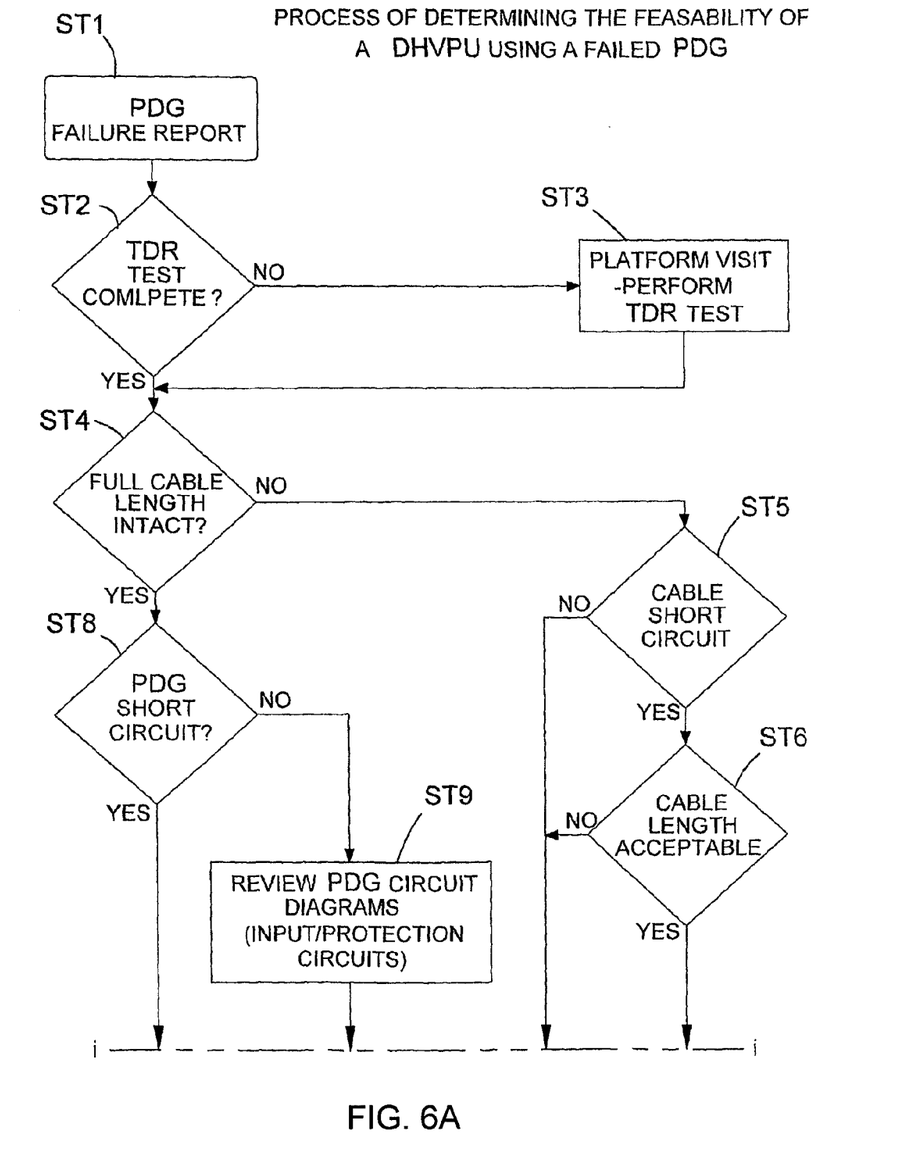
FIGS. 6A and 6B collectively depict a flow chart showing a process which may be followed in determining the feasibility of using a method or apparatus of the present specification in a well having a failed permanent downhole gauge.
Figure 6B:
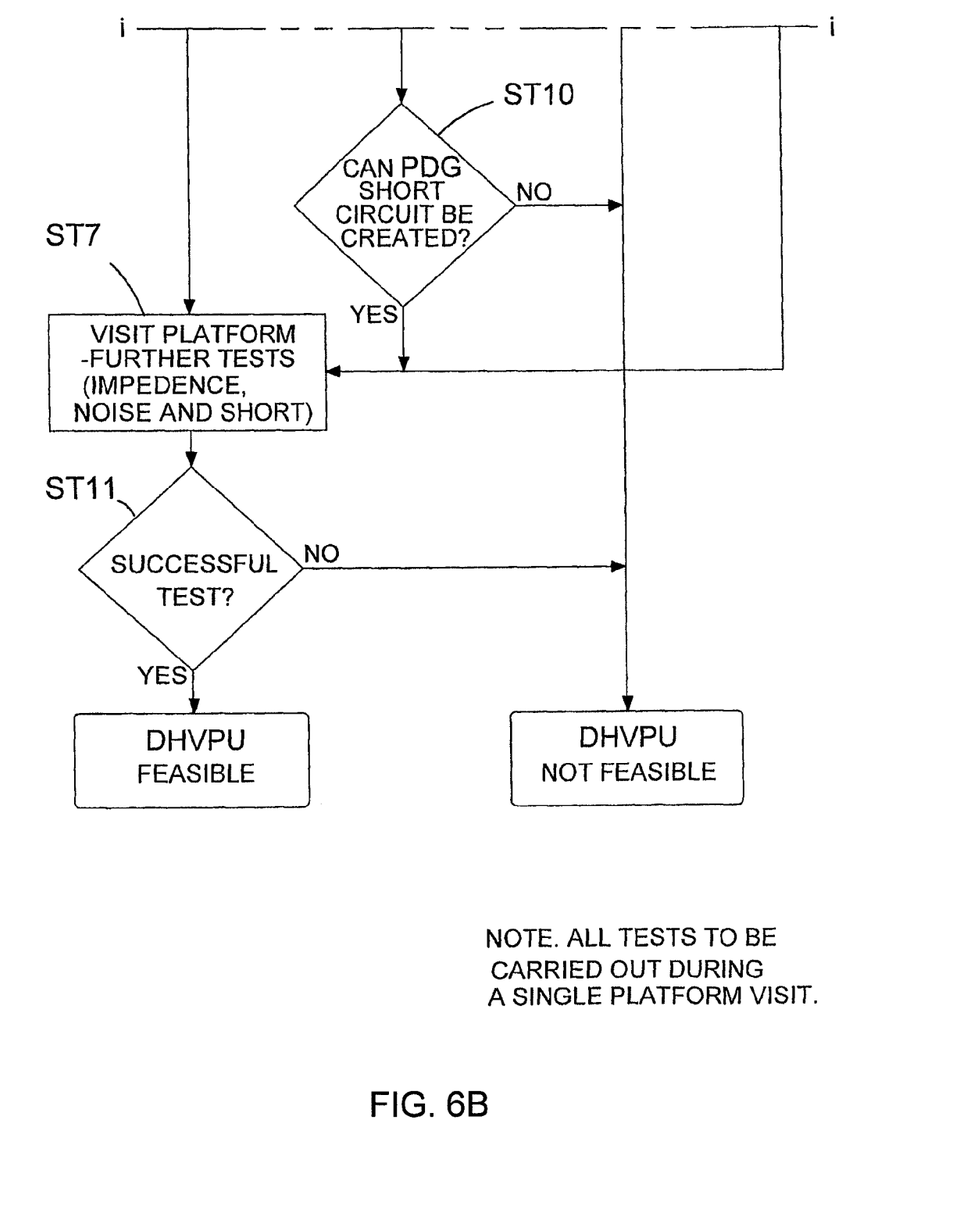

FIGS. 6A and 6B collectively show a flow chart illustrating a process which may be followed in determining whether it is feasible to use one of the techniques described above in a situation where there is a failed permanent downhole gauge 2 in a well. In step ST1 failure of the permanent downhole gauge is reported. In step ST2 it is established whether a time domain reflection (TDR) test has been completed. If the answer is no then a time domain reflection test is performed in step ST3. Time domain reflection (TDR) tests are conventionally used to determine the length of an electrical cable. Here the test is useful because it gives information about the length of the cable 3 in a well installation. Typically the depth of the permanent downhole gauge 2 provided in a well installation will be documented and therefore measurement of the effective length of cable 3 seen within the well gives information as to whether the cable is intact and contacting with the downhole gauge 2. Even if the cable is not intact and connected to the downhole gauge 2 it is still useful to know the length of the cable as this will determine whether, assuming there is a shortcircuit, the technique illustrated in FIG. 2 will be feasible.

In step ST4 it is determined whether the full cable length is intact. If the answer is no it is then determined whether there is a cable shortcircuit of the type shown in FIG. 2 in step ST5. If no cable shortcircuit is determined then the use of the present techniques is determined to be not feasible. However, if there is cable shortcircuit then in step ST6 it is decided whether or not the cable length as measured in the TDR test in step ST3 is acceptable. If the length of the cable is not acceptable it is again determined that the present techniques cannot be used. However, if the cable length is acceptable then the process proceeds to step ST7 where a platform visit is made to carry out further tests.

Returning now to the situation where the full length of cable is found intact in step ST4, it is then determined in step ST8 whether there is a shortcircuit within the failed permanent downhole gauge 2. If there is a shortcircuit in the downhole gauge 2 then again a platform visit is carried out in ST7 to perform further tests.

If it is determined that there is no shortcircuit in the failed downhole gauge 2 in step ST8, a review is made of the available circuit diagrams and information about the failed downhole gauge 2 in step ST9, then in step ST10 it is determined whether a shortcircuit can be created either by applying a biasing current as described above in relation to FIG. 3, or a destructive current as described above in relation to FIG. 5. If it is determined that no shortcircuit can be created then it is determined that none of the present techniques can be used whereas if it is decided that a shortcircuit can be created then the process returns to step ST7 where a platform visit is carried out for further tests.

By whichever route step ST7 is reached, after the platform visit is initiated, test communications are carried out at the platform in step ST11 where it is finally established whether one of the present techniques is feasible for communications or not.

It should be noted that whilst steps ST3 and ST7 both refer to platform visits being made, then typically a single platform visit will be carried out to perform these tests.

In at least some circumstances the majority of the steps, if not all of the steps, mentioned above in relation to FIG. 6 may be carried out by or using a computer controlled by suitable software.

Although the methods and apparatus of the present application are particularly suitable and of particular interest for use in existing, completed wells making use of existing hardware, i.e. existing cabling and downhole gauge units with existing topside apparatus for communication with the downhole gauge unit 2, in other circumstances the methods and apparatus may be used in new installations. In such cases, the downhole gauge unit and/or the topside apparatus 4 arranged for communication with the downhole gauge unit 2 may be particularly arranged for use in the present methods and apparatus. In such a way, the downhole gauge unit 2 could be arranged to have a mode of operation for using the downhole gauge and a mode of operation for communicating via the production tubing S2 with the downhole communication tool 5. Similarly the topside equipment 4 could have a mode of operating for detection of signals from the downhole gauge unit 2, a mode of operation for communicating with the downhole communication tool 5 and/or a mode of operation for supplying power to the downhole communication tool 5.

Of course with such a dedicated and specially designed downhole gauge unit 2 and/or topside apparatus 4 there would be fewer constraints over the routes to implementation and a simple switch mechanism could be provided in the downhole unit 2 to allow direct connection to the downhole structure S when it is intended to communicate with or transmit power to the downhole communication tool 5. The topside apparatus 4, could be similarly arranged to switch between communication modes such that signals may be simply applied to and extracted from the cable 3 when it is intended to communicate with the downhole communication tool 5 and/or supply power to the downhole communication tool 5.

some arrangements, when modifying the topside apparatus 4 into a form along the lines shown in FIG. 3 (for use in communicating with a downhole communication tool 5 making use of a downhole gauge unit 2 which is still functioning) it would sometimes be necessary to add the resistor 42 as well as the controllable direct current voltage source 43 and transmitter/receiver unit 44 to achieve an operative system. In other circumstances, however, there may be a resistance (which may for example be a resistor) already present in the topside apparatus 4 supplied for use with the downhole gauge unit 2 and this might allow the present methods and apparatus described in relation to FIG. 3 to work by adding just the controllable voltage source 43 and transmitter/receiver unit 44.

The invention claimed is:

1. A method of extracting data from an existing well installation having a downhole metallic structure, which installation comprises an existing cable running from the surface to a downhole sensor unit at a downhole location, the cable being provided in the well installation for providing a communication path to the surface for readings taken by the downhole sensor unit, the downhole sensor unit being arranged so that the cable is electrically connectable to the downhole metallic structure of the well installation through the sensor unit, and the method comprising the steps of:

operating on the downhole sensor unit to electrically connect the cable to the downhole metallic structure of the well;

introducing a tool into the existing well installation for applying signals to the downhole metallic structure of the well; and applying signals, which encode data, to the metallic structure using the tool and extracting the encoded data at the surface by making a connection to the existing cable and sensing signals in the cable.

2. A method according to claim 1 in which the tool is arranged for both sending and receiving signals and the method comprises the step of signalling in two directions along the cable and metallic structure.

3. A method according to claim 1 comprising the step of assessing the effective length of the cable.

4. A method according to claim 3 in which a TDR (time domain reflection) technique is used in assessing the effective length of the cable.

5. A method according to claim 1 in which a topside apparatus is provided for sensing signals in the cable.

6. A method according to claim 5 in which the topside apparatus is arranged for extracting data from the sensed signals.

7. A method according to claim 5 in which the topside apparatus is connected to the cable and to earth as a reference.

8. A method according to claim 1 in which the sensor unit is a permanent downhole gauge (PDG).

9. A method according to claim 1 in which the step of operating on the downhole sensor unit comprises the step of applying a biasing signal to the cable which causes the downhole sensor unit to connect the cable to the downhole metallic structure.

10. A method according to claim 9 in which the biasing signal is chosen so that after application of the biasing signal is ceased the downhole sensor unit returns to its original state.

11. A method according to claim 9 in which a topside apparatus is provided for sensing signals in the cable and is arranged to apply the biasing signal to the cable.

12. A method according to claim 1 in which the step of operating on the downhole sensor unit comprises the step of applying a destructive signal to the cable which causes the downhole sensor unit to irreversibly connect the cable to the downhole metallic structure.

13. A method according to claim 12 in which topside apparatus is provided for sensing signals in the cable and is arranged to apply the destructive signal to the cable.

14. A method of transmitting data to a downhole location in an existing well installation having a downhole metallic structure, which installation comprises an existing cable running from the surface to a downhole sensor unit at a downhole location, the cable being provided in the well installation for providing a communication path to the surface for readings taken by the downhole sensor unit, the downhole sensor unit being arranged so that the cable is electrically connectable to the downhole metallic structure of the well installation through the sensor unit, and the method comprising the steps of:
    operating on the downhole sensor unit to electrically connect the cable to the downhole metallic structure of the well;
    introducing a tool into the existing well installation for sensing signals on the downhole metallic structure of the well; and
    making a connection to the existing cable and applying signals, which encode data, to the metallic structure using the cable and extracting the encoded data at the tool by sensing signals in the metallic structure.

15. A downhole signalling system for extracting data from a well installation having a downhole metallic structure, which installation comprises a cable running from the surface to a downhole sensor unit at a downhole location, the cable being provided in the well installation for providing a communication path to the surface for readings taken by the downhole sensor unit, wherein the cable and downhole metallic structure of the well are electrically connectable to one another through the sensor unit, and the signalling system comprises:
    a tool disposed within the well and arranged for applying signals, which encode data, to the downhole metallic structure of the well; and
    a topside apparatus arranged for operating on the downhole sensor unit to electrically connect the cable to the downhole metallic structure and for extracting the encoded data at the surface by sensing signals in the cable.

16. A downhole signalling system according to claim 15 in which the signalling system is arranged for transmitting signals in two directions with the tool and topside apparatus being arranged both for transmitting and receiving signals.

17. A downhole signalling system according to claim 15 in which the topside apparatus comprises a voltage source.

18. A downhole signalling system according to claim 17 in which the voltage source is arranged for biasing the downhole sensor unit.

19. A downhole signalling system according to claim 17 in which the voltage source is connected in series between the cable and earth.

20. A downhole signalling system according to claim 17 in which impedance means are connected in series between the voltage source and the cable.

21. A downhole signalling system according to claim 20 in which the topside apparatus comprises at least one of a transmitter and a receiver, a terminal of which is connected to a contact point electrically between the cable and the impedance means.

22. A downhole signalling system according to claim 21 in which another terminal of the at least one of a transmitter and a receiver is connected to ground.

23. A downhole signalling system according to claim 22 in which the impedance means has a value chosen to substantially equalise the impedance seen between the voltage source and the contact point and the impedance seen between the contact point and ground via the cable.

24. A downhole signalling system according to claim 15 in which the topside apparatus comprises a current source.

25. A downhole signalling system according to claim 24 in which the current source is for biasing the downhole sensor unit.

26. A downhole signalling system according to claim 24 in which the current source is connected in series between the cable and earth.

27. A downhole signalling system according to claim 26 in which the topside apparatus comprises at least one of a transmitter and a receiver, a terminal of which is connected to a point between the current source and the cable.

28. A downhole signalling system according to claim 15 in which the topside apparatus is arranged to apply a destructive signal to the cable such as to cause the sensor unit to irreversibly connect the cable to the downhole metallic structure.

29. A downhole signalling system according to claim 28 in which the sensor unit comprises a surge protection device connected across the terminals of the sensor unit and the topside apparatus is arranged to apply a pulse of current of a suitable sense, magnitude and duration to destroy the surge protection device in such a way as to provide a short circuit.

30. A downhole signalling system for transmitting data to a downhole location in a well installation having a downhole metallic structure, which installation comprises a cable running from the surface to a downhole sensor unit at a downhole location, the cable being provided in the well installation for providing a communication path to the surface for readings taken by the downhole sensor unit, wherein the cable and downhole metallic structure of the well are electrically connectable to one another through the downhole sensor unit, and the signalling system comprises:

a topside apparatus arranged for operating on the downhole sensor unit to electrically connect the cable to the downhole metallic structure and for applying signals, encoding data, to the cable; and;

a tool disposed within the well and arranged for extracting the encoded data by sensing signals in the downhole metallic structure of the well.

31. A method of transmitting power to a downhole location in an existing installation having a downhole metallic structure, which installation comprises an existing cable running from the surface to a downhole sensor unit at a downhole location, the cable being provided in the well installation for providing a communication path to the surface for readings taken by the downhole sensor unit, the downhole sensor unit being arranged so that the cable is electrically connectable to the downhole metallic structure of the well installation through the sensor unit, and the method comprising the steps of:

operating on the downhole sensor unit to electrically connect the cable to the downhole metallic structure of the well;

introducing a tool into the existing well for extracting power from signals on the downhole metallic structure of the well; and making a connection to the existing cable and applying power signals to the metallic structure using the cable and extracting power at the tool by sensing resulting signals in the metallic structure.

32. A downhole power delivery system for transmitting power to a downhole location in a well installation having a downhole metallic structure, which installation comprises a cable running from the surface to a downhole sensor unit at a downhole location, the cable being provided in the well installation for providing a communication path to the surface for readings taken by the downhole sensor unit, wherein the cable and downhole metallic structure of the well are electrically connectable to one another through the downhole sensor unit, and the power delivery system comprises:

a topside apparatus arranged for operating on the downhole sensor unit to electrically connect the cable to the downhole metallic structure and for applying power signals to the cable; and a tool disposed within the well and arranged for extracting power by sensing resulting signals in the downhole metallic structure of the well.

* * * * *

UNITED STATES PATENT AND TRADEMARK OFFICE
CERTIFICATE OF CORRECTION

PATENT NO.        : 7,806,180 B2                                      Page 1 of 1
APPLICATION NO.   : 11/908627
DATED             : October 5, 2010
INVENTOR(S)       : Hudson It is certified that error appears in the above-identified patent and that said Letters Patent is hereby corrected as shown below:

Title page,

Insert the following:

Item --(30) Foreign Application Priority Data

March 22, 2005   (GB)   ........0505855.7--.

Signed and Sealed this
Twelfth Day of July, 2011

David J. Kappos
*Director of the United States Patent and Trademark Office*